US009787544B2

(12) United States Patent
Muñoz de la Torre Alonso et al.

(10) Patent No.: US 9,787,544 B2
(45) Date of Patent: Oct. 10, 2017

(54) INSTALLATION AND ENFORCEMENT OF DYNAMIC AND STATIC PCC RULES IN TUNNELING SCENARIOS

(75) Inventors: Miguel Angel Muñoz de la Torre Alonso, Madrid (ES); Maria Esther Terrero Díaz-Chirón, Madrid (ES); Miguel Angel Recio Rodriguez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 834 days.

(21) Appl. No.: 13/884,959

(22) PCT Filed: Nov. 12, 2010

(86) PCT No.: PCT/IB2010/055154
§ 371 (c)(1),
(2), (4) Date: Apr. 24, 2014

(87) PCT Pub. No.: WO2012/063106
PCT Pub. Date: May 18, 2012

(65) Prior Publication Data
US 2014/0317269 A1    Oct. 23, 2014

(51) Int. Cl.
*G06F 15/173* (2006.01)
*H04L 12/24* (2006.01)
(Continued)

(52) U.S. Cl.
CPC .......... *H04L 41/0893* (2013.01); *H04L 43/50* (2013.01); *H04L 47/20* (2013.01);
(Continued)

(58) Field of Classification Search
CPC ....... H04L 12/24; H04L 12/26; H04L 63/102; H04L 63/0272; H04L 47/20; H04L 43/50; H04L 41/0893; H04W 12/08
See application file for complete search history.

(56) References Cited

U.S. PATENT DOCUMENTS 7,864,708 B1 * 1/2011 Bryant ................ H04L 12/4633
370/238
2002/0188839 A1 * 12/2002 Noehring ................ H04L 29/06
713/153
(Continued)

FOREIGN PATENT DOCUMENTS

WO    2012/065626 A1    5/2012

OTHER PUBLICATIONS

EPO, Int'l Search Report in PCT/IB2010/055154, Jul. 26, 2011.
(Continued)

*Primary Examiner* — Benjamin M Thieu
(74) *Attorney, Agent, or Firm* — Patent Portfolio Builders PLLC (57) ABSTRACT

A Policy and Charging Enforcement Function (PCEF) device of a network having a Policy and Charging Rules Function (PCRF) device. The PCEF device includes a processing unit that detects a tunneled packet and the packet's Internet Protocol version type and determines whether activation of PCC rules in accordance with the IP version type of the tunneled packet is required from the PCRF device. The PCEF device includes a network interface unit in communication with the processing unit and the network that requests from the PCRF device required activation of PCC rules and identifies the IP version type of the tunneled packet to the PCRF device with the request and receives from the PCRF device the PCC rules activation. The processing unit enforces the PCC rules on the tunneled packet. Methods of handling and enforcing rules at a PCEF device of a network and at a PCRF device are also disclosed.

20 Claims, 2 Drawing Sheets

(51) Int. Cl.
*H04L 12/813* (2013.01)
*H04W 12/08* (2009.01)
*H04L 12/26* (2006.01)
*H04L 29/06* (2006.01)

(52) U.S. Cl.
CPC ........... *H04L 63/102* (2013.01); *H04W 12/08* (2013.01); *H04L 63/0272* (2013.01)

(56) References Cited

U.S. PATENT DOCUMENTS

| | | | |
|---|---|---|---|
| 2004/0037260 A1* | 2/2004 | Kakemizu | H04L 12/4641 370/338 |
| 2005/0099976 A1* | 5/2005 | Yamamoto | H04L 12/4633 370/331 |
| 2007/0195761 A1* | 8/2007 | Tatar | H04L 49/1546 370/389 |
| 2008/0002727 A1* | 1/2008 | Yamane | H04L 12/1836 370/401 |
| 2008/0049621 A1* | 2/2008 | McGuire | H04L 12/24 370/236.2 |
| 2008/0256220 A1* | 10/2008 | Bachmann | H04W 8/04 709/222 |
| 2008/0279181 A1* | 11/2008 | Shake | H04L 1/08 370/389 |
| 2009/0055543 A1* | 2/2009 | Rasanen | H04L 29/125 709/228 |
| 2009/0182883 A1* | 7/2009 | Giaretta | G06Q 40/00 709/228 |
| 2009/0196231 A1* | 8/2009 | Giaretta | H04L 12/14 370/328 |
| 2009/0310551 A1* | 12/2009 | Hellgren | H04L 69/28 370/329 |
| 2010/0142373 A1* | 6/2010 | Jin | H04L 12/14 370/230 |
| 2011/0173332 A1* | 7/2011 | Li | H04L 12/14 709/227 |
| 2011/0201303 A1* | 8/2011 | Cutler | H04L 12/14 455/406 |
| 2011/0222461 A1* | 9/2011 | Zhang | H04W 72/005 370/312 |
| 2011/0302289 A1* | 12/2011 | Shaikh | H04L 29/12216 709/223 |
| 2012/0005356 A1* | 1/2012 | Hellgren | H04L 63/20 709/229 |
| 2012/0059944 A1* | 3/2012 | Fernandez Alonso | H04L 12/1457 709/228 |
| 2012/0117220 A1* | 5/2012 | Mariblanca Nieves | H04L 12/14 709/223 |
| 2012/0117235 A1* | 5/2012 | Castro Castro | H04L 12/14 709/224 |
| 2012/0246325 A1* | 9/2012 | Pancorbo Marcos | H04L 12/2602 709/227 |
| 2012/0314688 A1* | 12/2012 | Taleb | H04W 36/08 370/331 |

OTHER PUBLICATIONS

EPO, Written Opinion in PCT/IB2010/055154, Jul. 26, 2011.
Balbas et al., Policy and Charging Control in the Evolved Packet System, Communications, Feb. 1, 2009, pp. 68-74, vol. 47, No. 2, IEEE.
Ericsson et al., S9* Gap Analysis, Tdoc S2-102462, May 10, 2010, pp. 1-6, 3GPP TSG SA WG2 Meeting #79, Kyoto, JP.
3GPP, CT WG3 Aspect of 3GPP System Architecture Evolution (Stage 3) (Release 8), Technical Report 29.804 V8.0.1, Dec. 2008.
3GPP, Policy and Charging Control Architecture (Release 10), Technical Specification 23.203 V10.0.0, Jun. 2010.
3GPP, Study on Policy Solutions and Enhancements (Release 10), Technical Report 23.813 V0.4.0, Oct. 2010.
3GPP, Policy and Charging Control over Gx Reference Point (Release 10), Technical Specification 29.212 V10.0.0, Sep. 2010.
3GPP, Policy and Charging Control over Rx Reference Point (Release 8), Technical Specification 29.214 V8.9.1, Sep. 2010.
IETF, Internet Protocol Version 6 (IPv6) Specification, RFC 2460, Dec. 1998.
IETF, Connection of IPv6 Domains via IPv4 Clouds, RFC 3056, Feb. 2001.
IETF, Diameter Base Protocol, RFC 3588, Sep. 2003.
IETF, Teredo: Tunneling IPv6 over UDP through Network Address Translations (NATs), RFC 4380, Feb. 2006.

* cited by examiner

INSTALLATION AND ENFORCEMENT OF DYNAMIC AND STATIC PCC RULES IN TUNNELING SCENARIOS

TECHNICAL FIELD

The present invention is related to detecting a tunneled packet and the packet's Internet Protocol "IP" version type and determines whether PCC rules in accordance with the tunneled packet are required. (As used herein, references to the "present invention" or "invention" relate to exemplary embodiments and not necessarily to every embodiment encompassed by the appended claims.) More specifically, the present invention is related to detecting by a Policy and Charging Enforcement Function "PCEF" device with Deep Packet Inspection "DPI" capabilities of a network a tunneled packet and the packet's Internet Protocol "IP" version type and determining whether PCC rules in accordance with the tunneled packet are required, and either requests activation of PCC rules from a Policy and Charging Rules Function "PCRF" server of the network, or applies local rules, if available at the PCEF device with DPI capabilities.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Internet Protocol version 6 (IPv6) is an Internet Protocol version which is designed to succeed IPv4, the first implementation which is still in dominant use. It is an Internet Layer protocol for packet-switched networks. The main driving three for the redesign of Internet Protocol is the foreseeable IPv4 address exhaustion. IPv6 has a vastly larger address space than IPv4. This results from the use of a 128-bit address, whereas IPv4 uses only 32 bits. Until IPv6 completely supplants IPv4, a number of transition mechanisms are needed to enable IPv6-only hosts to reach IPv4 services and to allow isolated IPv6 hosts and networks to reach the IPv6 Internet over the IPv4 infrastructure. It is expected that IPv4 and IPv6 will coexist for many years during this transition.

In order to reach the IPv6 Internet, an isolated host or network must use the existing IPv4 infrastructure to carry IPv6 packets. This is done using a technique known as tunneling which consists of encapsulating IPv6 packets within IPv4, in effect using IPv4 as a link layer for IPv6. There are several types of tunneling where the most common ones are the 6-to-4 tunnels (RFC 3056) and the IPv6 Teredo tunnels (RFC 4380). For this invention the differentiation of the used tunnel is not a relevant issue.

Figure 1:
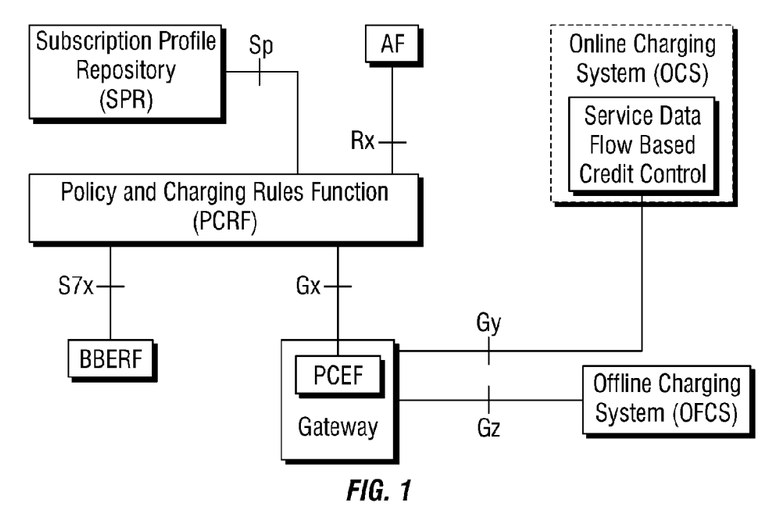
FIG. 1 shows a PCC policy and charging control architecture.

Policy and Charging Control (PCC) architecture permits to integrate both policy and charging control. The architecture that supports Policy and Charging Control functionality is shown in FIG. 1. FIG. 1 shows a PCC policy and charging control architecture. FIG. 1 has been taken from TS 23.203, which specifies the PCC functionality for Evolved 3GPP Packet Switched domain, including both 3GPP accesses (GERAN/UTRAN/E-UTRAN) and Non-3GPP accesses. It has been marked in yellow the nodes that would receive any impact from this invention.

The Gx reference point is defined in 3GPP TS 29.212 and lies between the Policy and Charging Rule Function (PCRF) and the Policy and Charging Enforcement Function (PCEF). The Gx reference point is used for provisioning/activation and removal/deactivation of PCC rules from the PCRF to the PCEF and the transmission of traffic plane events from the PCEF to the PCRF. The Gx reference point can be used for charging control, policy control or both.

3GPP TS 29.212 specifies two different types of PCC
  Dynamic PCC rules: They are dynamically provisioned by the PCRF to the PCEF via the Gx interface and may be either predefined or dynamically generated in the PCRF. Dynamic PCC rules can be installed, modified and removed at any time.
  Static PCC rules: They are configured in the PCEF and can be activated or deactivated by the PCRF or by the PCEF at any time. Static PCC rules within the PCEF may be grouped allowing the PCRF to dynamically activate a set of static PCC rules over the Gx reference point. Those static PCC rules to be locally activated by the PCEF are not explicitly known in the PCRF, but the PCRF simply knows identifiers of static PCC rules to be activated from the PCRF.

Some of the PCC rules, the dynamic ones, are based on the user IP address. The static PCC rules may also be based on the user IP address but since they are locally configured in the PCEF its content is dependent on the operator needs.

Concretely, according to TS 29.212, a PCC rule consists of
  a rule name;
  service identifier;
  service data flow filter(s);
  precedence;
  gate status;
  QoS parameters;
  charging key (i.e. rating group);
  other charging parameters.

Where the service data flow filters are used to select the traffic for which the rule applies. They contain among other parameters the source and destination IP addresses that can be IPv4 (for the IPv4 PCC rules) or IPv6 addresses (for the IPv6 PCC rules).

The Rx reference point is defined in 3GPP IS 29.214 and is used to exchange application level session information between the Policy and Charging Rules Function (PCRF) and the Application Function (AF). An example of PCRF is Ericsson SAPC. An example of AF is the IMS P-CSCF. Note both Gx and Rx reference points are based on Diameter (RFC 3588).

DPI (Deep Packet Inspection) technology supports packet inspection and service classification, which consists on IP packets classified according to a configured tree of rules so that they are assigned to a particular service session. DPI is now under standardization, the so-called Traffic Detection Function (TDF), which can be either stand-alone or collocated with PCEF, please refer to 3GPP TR 23.813 for details.

Support for IPv6 is now being implemented in packet networks. During the migration period from IPv4 to IPv6, tunneling techniques are needed, that is, encapsulating IPv6 packets within IPv4 (or IPv4 packets within IPv6 depending on the applicable scenario).

In case of a legacy IPv4 UE (i.e. not supporting dual stack) and when the user wants to access IPv6 services (e.g. a laptop connected to a legacy UE), a tunnel IPv6 over IPv4 needs to be established. The PCC architecture as currently defined by 3GPP does not address the installation and enforcement of IPv6 PCC rules for the tunneling scenarios above. A legacy IPv4 LIE can only request PDN Type IPv4, so the PCEF (PGW/GGSN) will assign an IPv4 address to the UE. As a consequence, PCEF will establish a Gx connection with the PCRF using the IPv4 address assigned, and only PCC rules based on the user IPv4 address will be installed/activated from PCRF to PCEF.

For the above tunneling scenarios, the IPv4 PCC rules are irrelevant as they just identify the tunnel endpoints. The important rules are the IPv6 ones, which cannot be installed using the current PCC architecture.

SUMMARY

A node with DPI capabilities (e.g. Ericsson SASN or GGSN) is deployed in the operator's IP network and captures the user and signaling traffic, and is able to assign IP packets to a particular service session and, specifically, DPI could also be used to detect tunneled packets. However, the existing functionality needs to be enhanced in order to notify PCRF that the user is tunneling packets, so the appropriate PCC rules can be downloaded. The use of PCC rules for tunneled packets is especially relevant from the security point of view, in order to allow access control (or any other policy) for services using the tunnel.

The present invention pertains to a PCEF device with DPI capabilities of a network. The network has a PCRF server. The PCEF device with DPI capabilities comprises a processing unit which detects a tunneled packet and the packet's IP version type and determines whether activation of PCC rules in accordance with the IP version type of the tunneled packet is required from the PCRF server. The PCEF device with DPI capabilities comprises a network interface unit in communication with the processing unit and the network which requests from the PCRF server, if required, the activation of PCC rules and which identifies the IP version type of the tunneled packet to the PCRF server with the request and which receives from the PCRF server the activation of the PCC rules. The processing unit enforces the PCC rules in accordance with the IP version type of the tunneled packet on the tunneled packet. In particular, the PCC rules may be dynamic PCC rules provided by the PCRF server along with the activation of said PCC rules, or may be static PCC rules defined at the PCEF device with DPI capabilities. More particularly, where the PCC rules are static PCC rules, the activation may be required from the PCRF server, or may be implicitly applied at the PCEF device with DPI capabilities.

The present invention pertains to a method of handling and enforcing PCC rules at a PCEF device with DPI capabilities of a network. The network has a PCRF server. The method comprises the steps of detecting with a processing unit of the PCEF device with DPI capabilities a tunneled packet and the packet's Internet Protocol (IP) version type. There is the step of determining with the processing unit of the PCEF whether activation of PCC rules in accordance with the IP version type of the tunneled packet is required from the PCRF server. Where activation is required from the PCRF server, there is the step of requesting through a network interface unit of the PCEF device with DPI capabilities from the PCRF server, the activation of PCC rules and identifying the IP version type of the tunneled packet to the PCRF server with the requesting step; and there is the step of receiving at the network interface unit of the PCEF device with DPI capabilities from the PCRF server the activation of PCC rules. There is the step of enforcing with the processing unit of the PCEF device with DPI capabilities the PCC rules in accordance with the IP version type of the tunneled packet on the tunneled packet.

The present invention pertains to a PCRF server of a network for handling PCC rules. The network has a PCEF device with DPI capabilities. The PCRF server comprises a network interface unit which receives a request from the PCEF device with DPI capabilities for activation of PCC rules for a tunneled packet that the PCEF device with DPI capabilities has detected, the request including the Internet Protocol "IP" version type of the tunneled packet. The PCRF server comprises a memory having the PCC rules. The PCRF server comprises a processing unit which determines whether the PCC rules in accordance with the IP version type of the tunneled packet have to be provided from the memory and sends the activation of the PCC rules in accordance with the IP version type of the tunneled packet through the network interface unit to the PCEF device with DPI capabilities.

The present invention pertains to a method of handling rules at a Policy and Charging Rules Function "PCRF" server of a network. The network has a Policy and Charging Enforcement Function "PCEF" device with Deep Packet Inspection "DPI" capabilities. The method comprises the steps of receiving at a network interface unit of the PCRF server a request from the PCEF device with DPI capabilities for activation of PCC rules for a tunneled packet that the PCEF device with DPI capabilities has detected. The request includes the Internet Protocol (IP) version type of the tunneled packet. There is the step of determining with a processor unit of the PCRF server whether the PCC rules in accordance with the IP version type of the tunneled packet have to be provided from a memory of the PCRF server having said PCC rules. There is the step of sending the PCC rules in accordance with the IP version type of the tunneled packet through the network interface unit of the PCRF server to the PCEF device with DPI capabilities.

The present invention generally relates to installation and enforcement of PCC rules; and, more particularly, to PCC rules applying in IPv6 over IPv4 tunnelling scenarios.

IPv6 is an Internet Protocol version which is designed to replace IPv4, wherein address exhaustion is foreseeable. IPv6 has a vastly larger address space than IPv4, resulting from the use of a 128-bit address, whereas IPv4 uses only 32 bits. Whilst IPv6 and IPv4 coexist, a number of transition mechanisms are needed to enable IPv6-only hosts to reach IPv4 services and to allow isolated IPv6 hosts and networks to reach the IPv6 Internet over the IPv4 infrastructure. This is done by using tunnelling techniques, which allow encapsulating IPv6 packets within IPv4, as well as IPv4 packets within IPv6. In this respect, nothing precludes encapsulating IPv6 packets within IPv6 as well as encapsulating IPv4 packets within IPv4.

On the other hand, the Policy and Charging Control (PCC) architecture permits to integrate both policy and charging control functionality for Evolved 3GPP Packet Switched domain, as described in 3GPP TS 23.203, including both 3GPP accesses (GERAN/UTRAN/E-UTRAN) and Non-3GPP accesses. Moreover, a so-called Gx reference point is defined in 3GPP TS 29.212 and lies between the Policy and Charging Rule Function (PCRF) and the Policy and Charging Enforcement Function (PCEF). The Gx reference point is used for provisioning and removal of PCC rules from the PCRF to the PCEF and the transmission of traffic plane events from the PCEF to the PCRF.

Apart from PCRF and PCEF, the PCC architecture may include Deep Packet Inspection (DPI) technology to support packet inspection and service classification, that is, classifying IP packets according to a configured tree of rules so that they are assigned to a particular service session. DPI is now under standardization, the so-called Traffic Detection Function (TDF) in 3GPP TR 23.813, and can be either stand-alone or collocated with PCEF.

At present, dynamic PCC rules are based on the user IP address, whereas static PCC rules may also be based on the user IP address. In order to incorporate support for IPv6 in packet networks there is a need for tunnelling techniques to encapsulate IPv6 packets within IPv4, and to encapsulate IPv4 packets within IPv6, depending on the applicable scenario. As already commented above, nothing in this specification precludes encapsulating IPv4 packets within IPv4, or IPv6 packets within IPv6.

However, the PCC architecture as currently defined by 3GPP does not address the installation and enforcement of IPv6 PCC rules for tunnelling scenarios. For instance, a legacy IPv4 UE can only request PDN Type IPv4, so the PCEF (PGW/GGSN) will assign an IPv4 address to the UE. As a consequence, PCEF will establish a Gx connection with the PCRF using the IPv4 address assigned, and only PCC rules based on the user IPv4 address will be installed or activated from PCRF to PCEF.

To overcome these problems, or at least to mitigate them, the present invention provides for a new DPI engine, which includes DPI capabilities, enabled to detect tunnelled packets; enhanced PCEF device and PCRF server enabled to be notified of the tunnelled packets so that appropriate PCC rules can be downloaded; and a new method of handling and enforcing PCC rules for tunnelled packets through the bearer layer.

The present invention thus provides for a DPI engine enabled to detect tunnelled packets and to notify an IP version type of the tunnelled packet to the PCEF device; the PCEF device installing either dynamic rules Obtained and activated from the PCRF server, or static rules available at the PCEF device and activated from the PCRF server or from the PCEF device, both dynamic and static rules being in accordance with the IP version type of the tunnelled packet; and the PCRF server being enabled to generate PCC rules IPv6 or IPv4 in accordance with the IP version type received from the PCEF device.

The present invention also provides for a method of handling and enforcing PCC rules for tunnelled packets through the bearer layer, the method comprising the steps of:
  detecting at a DPI engine tunnelled packets and determining an IP version type of the tunnelled packet;
  notifying from the DPI engine to a PCEF device the IP version type of the tunnelled packet;
  determining at the PCEF device whether activation of PCC rules in accordance with the IP version type is required from a PCRF server;
  where activation of PCC rules is required from the PCRF server, requesting from the PCEF device to the PCRF server the activation of PCC rules, the request including the IP version type of the tunnelled packet; determining at the PCRF server whether the PCC rules to be applied in accordance with the IP version type of the tunnelled packet have to be provided towards the PCEF device; submitting from the PCRF server to the PCEF device the activation of the PCC rules; and enforcing at the PCEF device the PCC rules in accordance with the IP version type of the tunnelled packet; and
  enforcing at the PCEF device the PCC rules in accordance with the IP version type of the tunnelled packet on the tunnelled packet, these PCC rules either provided by the PCRF server or locally available at the PCEF device.

BRIEF DESCRIPTION OF THE DRAWINGS

In the accompanying drawings, the preferred embodiment of the invention and preferred methods of practicing the invention are illustrated in which.

DETAILED DESCRIPTION

Figure 4:
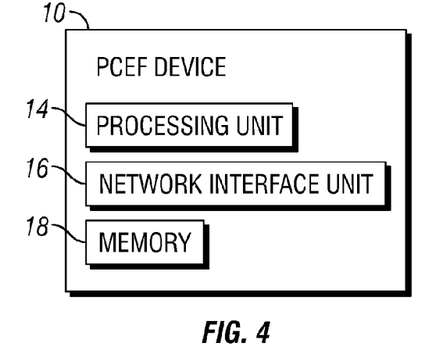
FIG. 4 is a block diagram of a PCEF device of the present invention.

Referring now to the drawings wherein like reference numerals refer to similar or identical parts throughout the several views, and more specifically to FIG. 4 thereof, there is shown a PCEF device 10 with DPI capabilities of a network. The network has a PCRF server 12. The PCEF device 10 with DPI capabilities comprises a processing unit 14 which detects a tunneled packet and the packet's IP version type and determines whether activation of PCC rules in accordance with the IP version type of the tunneled packet is required from the PCRF server 12. The PCEF device 10 comprises a network interface unit 16 in communication with the processing unit 14 and the network which requests from the PCRF server 12, if activation is required from the PCRF server, the activation of PCC rules and which identifies the IP version type of the tunneled packet to the PCRF server 12 with the request, and which receives from the PCRF server 12 the activation PCC rules in accordance with the IP version type of the tunneled packet. The processing unit 14 enforces the PCC rules on the tunneled packet.

The PCEF device 10 with DPI capabilities may include a memory 18 and the (processing unit 14 may determine that the PCC rules in accordance with the IP version type of the tunneled packet are available in the memory 18, and these PCC rules may be activated from the PCRF server 12 or implicitly at the PCEF device 10 with DPI capabilities. Alternatively, the processing unit 14 through the network interface unit 16 of the PCEF device 10 with DPI capabilities may receive from the PCRF server 12 the PCC rules in accordance with the IP version type of the tunneled packet to be enforced on the tunneled packet. The processing unit 14 may enforce the PCC rules accordance with the IP version type of the tunneled packet, either received from the PCRF server 12 or obtained from the memory 18 of the PCEF device 10 with DPI capabilities, on the tunneled packet.

The network interface unit 16 may send a Gx Credit Control Request "CCR" update message to the PCRF server 12 which includes the request for activation of PCC rules and the IP version type of the tunneled packet. The Gx CCR update message may include a new tunneling indicator Attribute Value Pair "AVP", and at least one of a framed-IP-address AVP and a framed-IPv6-prefix AVP. The processing unit 14 may obtain from the tunneled packet source and destination IP addresses, source and destination ports and protocol.

The present invention pertains to a method of handling and enforcing rules at a PCEF device 10 with DPI capabilities of a network. The network has a PCRF server 12. The method comprises the steps of detecting, with a processing unit 14 of the PCEF device 10 with DPI capabilities a tunneled packet and the packet's IP version type. There is the step of determining with the processing unit 14 of the PCEF device 10 with DPI capabilities whether activation of PCC rules in accordance with the IP version type of the tunneled packet is required from the PCRF server 12. Where activation is required from the PCRF server 12, there is the step of requesting through a network interface unit 16 of the PCEF device 10 with DPI capabilities from the PCRF server 12 activation of PCC rules and identifying the IP version type of the tunneled packet to the PCRF server 12 with the requesting step; and there is the step of receiving at the network interface unit 16 of the PCEF device 10 with DPI capabilities from the PCRF server 12 the activation of PCC rules in accordance with the IP version type of the tunneled packet. There is the step of enforcing with the processing unit 14 of the PCEF device 10 with DPI capabilities the PCC rules in accordance with the IP version type of the tunneled packet on the tunneled packet.

The step of receiving from the PCRF server 12 the activation of PCC rules may include the step of receiving by the processing unit 14 through the network interface unit 16 from the PCRF server the PCC rules in accordance with the IP version type of the tunneled packet to be enforced on the tunneled packet. Alternatively, there is a step of obtaining from a memory 18 of the PCEF device with DPI capabilities the PCC rules in accordance with the IP version type of the tunneled packet, wherein these PCC rules may be activated from the PCRF server 12 or implicitly at the PCEF device 10 with DPI capabilities. The enforcing step may include the step of enforcing the PCC rules in accordance with the IP version type of the tunneled packet, PCC rules either received from the PCRF server 12 or obtained from the memory 18 of the PCEF device 10 with DPI capabilities, on the tunneled packet.

The requesting step may include the step of sending from the network interface unit 16 of the PCEF device 10 with DPI capabilities a Gx Credit Control Request "CCR" update message which includes the request for activation of PCC rules and the IP version type of the tunneled packet. The sending of the Gx CCR update message may include a new tunneling indicator Attribute Value Pair "AVP", and at least one of: a framed-IP-address AVP and a framed-IPv6-prefix AVP. The detecting step may include the step of obtaining from the tunneled packet source and destination IP addresses, source and destination ports and protocol.

Figure 5:
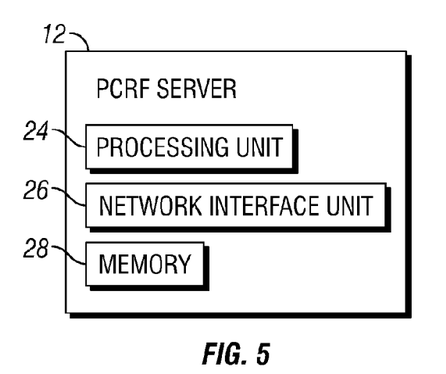
FIG. 5 is a block diagram of a PCRF server of the present invention.

The present invention pertains to a PCRF server 12 of a network for handling PCC rules, as shown in FIG. 5. The network has a PCEF device 10 with DPI capabilities. The PCRF server 12 comprises a network interface unit 26 which receives a request from the PCEF device 10 with DPI capabilities for activation of PCC rules for a tunneled packet that the PCEF device 10 with DPI capabilities has detected. The request includes the IP version type of the tunneled packet. The PCRF server 12 comprises a memory 28 having PCC rules. The PCRF server 12 comprises a processing unit 24 which determines whether the PCC rules in accordance with the IP version type of the tunneled packet have to be provided from the memory 28 towards the PCEF device 10 with DPI capabilities and sends the activation of the PCC rules in accordance with the IP version type of the tunneled packet through the network interface unit 26 to the PCEF device 10 with DPI capabilities.

The processing unit 24 may select and install/activate IPv6 as well as IPv4 PCC rules for the tunneled packet in a Gx Credit Control Answer "CCA" update message and sends the message through the network interface unit 26 to the PCEF device 10 with DPI capabilities.

The present invention pertains to a method of handling rules at a. PCRF server 12 of a network. The network has a PCEF device 10 with DPI capabilities. The method comprises the steps of receiving at a network interface unit 26 of the PCRF server 12 a request from the PCEF device 10 with DPI capabilities for activation of PCC rules for a tunneled packet that the PCEF device 10 with DPI capabilities has detected. The request includes the IP version type of the tunneled packet. There is the step of determining with a processing unit 24 of the PCRF server 12 whether the PCC rules in accordance with the IP version type of the tunneled packet from a memory 28 of the PCRF server 12 have to be provided. There is the step of sending the activation of the PCC rules in accordance with the IP version type of the tunneled packet through the network interface unit 26 of the PCRF server 12 to the PCEF device 10 with DPI capabilities.

There may be the steps of selecting and installing/activating with the processing unit 24 IPv6 as well as IPv4 PCC rules for the tunneled packet in a Gx Credit Control Answer "CCA" update message and sending the message through the network interface unit 26 of the PCRF 12 server to the PCEF device 10 with DPI capabilities.

The present invention enhances the current PCC architecture defined by 3GPP in order to allow installation/activation, update and removal/deactivation of IPv6 PCC rules in IPv6 over IPv4 tunneling scenarios as well as installation/activation, update and removal/deactivation of IPv4 PCC rules in IPv4 over IPv6 tunneling scenarios. Also covered is the PCEF device 10 enforcement of the IPv6 and IPv4 PCC rules on the tunneled packets.

The present invention could also apply to other tunneling scenarios (e.g. IPv4 over IPv4 and IPv6 over IPv6). As part of the present invention, there is a mechanism to detect tunneled packets using DPI techniques and to notify PCRF server 12 node accordingly. The present invention also implements a local policy in the PCEF device 10 with DPI capabilities node, so after detection of tunneled packets by using DPI techniques, the PCEF device 10 with DPI capabilities itself may activate locally defined IPv6 or IPv4 PCC rules, without the need of PCRF server 12 interaction.

The present invention defines the following enhancements to the current 3GPP PCC architecture:
  Allow a PCEF device 10 with DPI capabilities to detect
    tunneled packets (any of IPv6 over IPv4, IPv6 over
    IPv6, IPv4 over IPv6, or IPv4 over IPv4).
  On detection of IPv6 over IPv4, or IPv6 over IPv6,
    tunneled packets, PCEF device 10 with DPI capabilities requests activation of IPv6 PCC rules to the PCRF
    server 12 by means of a Gx CCR update message, by
    sending the Framed-IPv6-Prefix AVP together with a
    new Tunneling-Indicator AVP; and, where IPv6 over
    IPv4 tunneled packets are detected, by optionally
    including the Framed-IP-Address AVP currently disclosed in 3GPP technical specifications for conventional IPv4. On the other hand, on detection of IPv4
    over IPv6, or IPv4 over IPv4; tunneled packets, PCEF
    device 10 with DPI capabilities requests activation of
    IPv4 PCC rules to the PCRF server 12 by means of a
    Gx CCR update message, by sending the Framed-IP-Address AVP currently disclosed in 3GPP technical
    specifications for conventional IPv4, together with a
    new Tunneling-Indicator AVP; and, where IPv4 over
    IPv6 tunneled packets are detected, by optionally
    including the Framed-IPv6-Prefix AVP.

On reception of the above message, PCRF server 12 may select and install/activate the IPv6 or IPv4 PCC rules by sending the corresponding Gx CCA update message. PCEF device 10 with DPI capabilities will enforce the IPv6 or IPv4 PCC rules on the tunneled packets.

Two different scenarios are presented:

A) Using Gx interface for IPv6 or IPv4 PCC rules installation/activation. In this respect, installation may be interpreted as including the provision and activation of PCC rules; and B) Local PCEF device 10 with DPI capabilities, activation IPv6 or IPv4 PCC rules.

A) Using Gx Interface for IPv6 or IPv4 PCC Rules Installation/Activation

The detailed functionality is described below and depicted in FIG. 2 and FIG. 3, FIG. 2 exemplary shows scenario A) Using Gx interface for IPv6 PCC rules installation/activation. FIG. 3 shows a DPI engine analysis.

1) Detection of Tunneled Packets.

Figure 2:
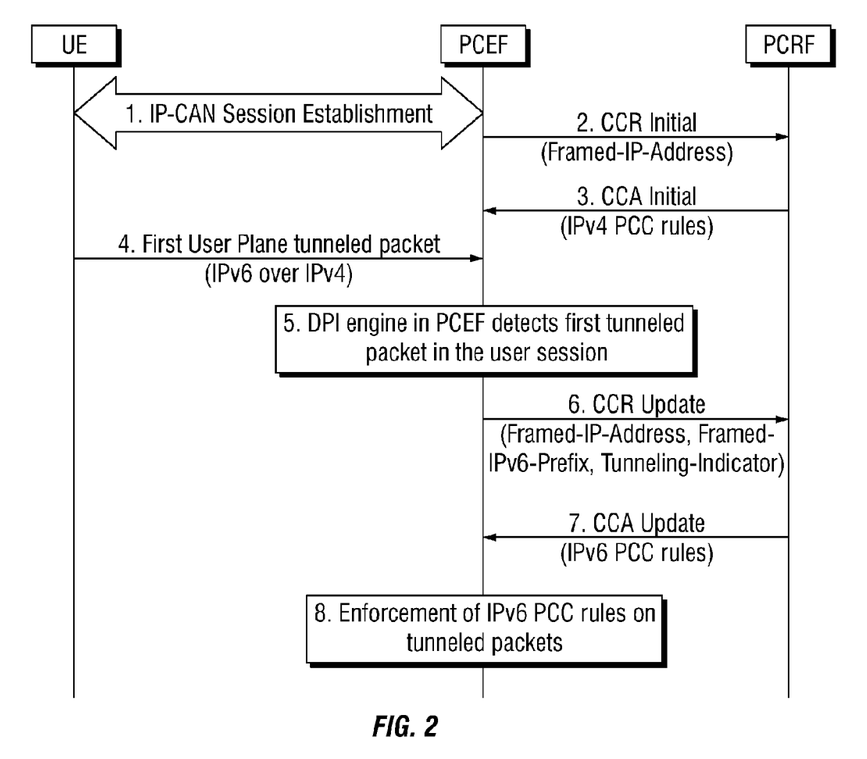
FIG. 2 shows scenario A) Using Gx interface for IPv6 PCC rules installation/activation.
Figure 3:
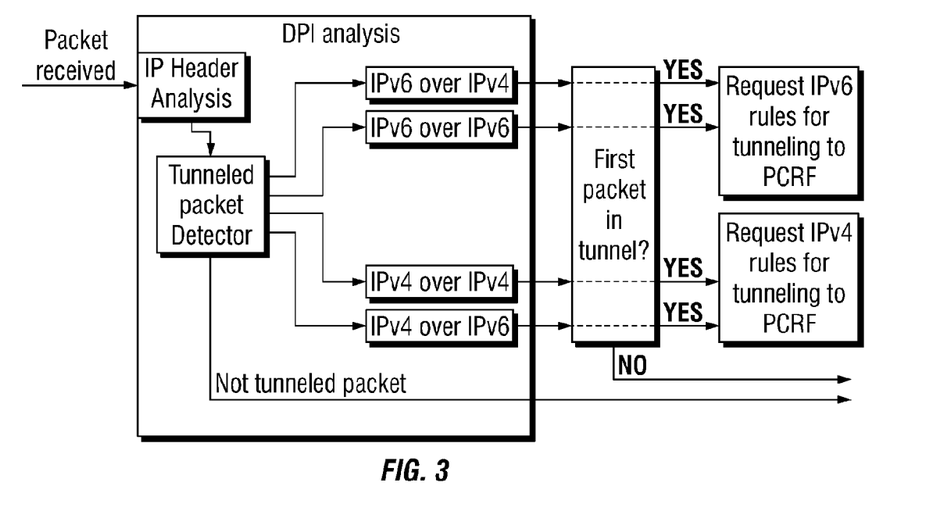
FIG. 3 shows a DPI engine analysis.

Upon IP-CAN session establishment the PCRF server 12 activates in the PCEF device 10 with DPI capabilities the IPv4 PCC rules corresponding to the PDN session that has been established (in FIG. 2, steps 1-3).

In case the feature is active, the PCEF device 10 with DPI capabilities will detect tunneled packets (exemplary in this case IPv6 over IPv4) as follows (steps 4-5 in FIG. 2 and FIG. 3), For each IP packet received, shallow inspection will be performed in order to get the 5-tuple (source and destination IP addresses, source and destination ports and protocol).

An IPv6 over IPv4 tunneled packet is detected in case the IP packet is IPv4 and the protocol in the 5-tuple indicates the next protocol is IPv6.

The IPv6 header will be inspected in order to get and store the IPv6 prefix corresponding to the UE side.

2) Request for IPv6 PCC Rules for Tunneled Packets (Step 6 in FIG. 2).

When the first IPv6 over IPv4 tunneled packet is detected within a user session, the PCEF device 10 with DPI capabilities will trigger a Gx CCR update message to PCRF server 12 in order to request activation of IPv6 PCC rules. The Gx CCR update message will include the stored IPv6 prefix (Framed-IPv6-Prefix AVP) optionally along with the existing IPv4 address (Framed-IP-Address AVP), and will also include a new AVP (Tunneling-Indicator AVP), which may just be a binary flag, in order to indicate PCRF server 12 that IPv6 PCC rules are specifically requested to be applied for IPv6 over IPv4 tunneled packets. This is also needed to avoid any PCRF server 12 misbehavior by indicating that the IPv6 address does not mean the UE supports dual stack (IPv4v6 addresses).

3) Installation/Activation of IPv6 PCC Rules for IPv6 Over IPv4 Tunneled Packets (Step 7 in FIG. 2).

As a response to the Gx CCR update message, the PCRF server 12 will select and install/activate the IPv6 PCC rules by sending the corresponding Gx CCA update message (Charging-Rule-Install AVP).

Note that IPv6 PCC rules may be either dynamic (Charging-Rule-Definition AVP), static (Charging-Rule-Name AVP and/or Charging-Rule-Base-Name AVP) or both.

4) Enforcement of IPv6 PCC Rules for IPv6 Over IPv4 Tunneled Packets (Step 8 in FIG. 2).

On reception of the IPv6 PCC rules, PCEF device 10 with DPI capabilities will enforce them on the tunneled packets as follows:

For each IP packet received after the rules are installed/activated, shallow inspection will be performed in order to get the 5-tuple (source and destination IP addresses, source and destination ports and protocol).

A tunneled packet (IPv6 over IPv4) is detected in case the IP packet is IPv4 and the protocol in the 5-tuple indicates the next protocol is IPv6, For each tunneled packet detected, the IPv6 PCC rules will be evaluated in their order of precedence.

When a match is found, the corresponding policies will apply (e.g. a tunneled packet could be dropped by the PCEF device 10 with DPI capabilities if the IPv6 PCC rule determines so).

NOTE: It is up to PCRF server 12 to define the precedence values between installed IPv4 and IPv6 PCC rules and also within IPv6 PCC rules.

The above procedure is the one corresponding to the exemplary installation/activation of IPv6 PCC rules for IPv6 over IPv4 tunneled packets. It is also proposed to support the update or removal/deactivation of the IPv6 PCC rules, but this is not described in detail in the present invention.

B) Local PCEF Device 10 with DPI Capabilities, Activation IPv6 or IPv4 PCC Rules:

It is also proposed to have a local policy in the PCEF device 10 with DPI capabilities, so after detection of tunneled packets by using DPI techniques, the PCEF device 10 with DPI capabilities itself may activate locally defined static IPv6 or IPv4 PCC rules, without the need of PCRF server 12 interaction. The detailed functionality is described below:

1) Detection of Tunneled Packets.

Same as step 1) in scenario A) above.

2) Selection and Local PCEF Device 10 with DPI Capabilities Activation of IPv6 or IPv4 PCC Rules for Tunneled Packets.

When the first tunneled packet is detected within a user session, exemplary in this case IPv6 over IPv4 as for the scenario A) above, PCEF device 10 with DPI capabilities will select and activate the locally defined IPv6 PCC rules for tunneled packets.

NOTE: It is assumed these IPv6 PCC rules are configured as static PCC rules in PCEF device 10 with DPI capabilities.

3) Enforcement of IPv6 PCC Rules for the Exemplary IPv6 Over IPv4 Tunneled Packets.

Same as step 4) in scenario A) above.

Both alternatives A) and B) above can also be used for any other tunneling scenarios. For example, in the case of IPv4 over IPv6, and for alternative A), a. UE with IPv6 only support can only request PDN Type IPv6, so the PCEF device 10 with DPI capabilities (PGW/GGSN) will assign an IPv6 address to the UE. As a consequence. PCEF device 10 with DPI capabilities will establish a Gx connection with the PCRF server 12 initially using the IPv6 address assigned, and only IPv6 PCC rules will be initially installed/activated from PCRF server 12 to PCEF device 10 with DPI capabilities. The PCEF device 10 with DPI capabilities can detect IPv4 over IPv6 tunneled packets and then notify PCRF server 12 in order to request the IPv4 PCC rules, and when they are installed/activated, PCEF device 10 with DPI capabilities will enforce them on IPv4 over IPv6 tunneled packets.

Another common tunneling scenario is IPv4 over IPv4. In this case, when PCEF device 10 with DPI capabilities detects IPv4 over IPv4 tunneled packets, PCEF device 10 with DPI capabilities will notify PCRF server 12 in order to request the specific IPv4 PCC rules for tunneling (Tunneling-Indicator AVP), and when they are installed/activated, PCEF device 10 with DPI capabilities will enforce them on IPv4 over IPv4 tunneled packets.

The main advantages of the invention are the following:

Allow policy control (access control, charging, QoS control, etc) through installation of specific PCC rules for tunneling scenarios (IPv6 over IPv4, IPv4 over IPv6, IPv6 over IPv6, and IPv4 over IPv4). This is not currently supported by 3GPP, Gx interface does not provide the means.

Simple mechanism with minimal impact on the Gx interface, with only one new AVP required (Tunneling-Indicator AVP).

The use of PCC rules for tunneled packets is especially relevant from the security point of view, in order to allow access control (or any other policy) for services using the tunnel. It is common practice to use tunneling to avoid network control on specific services.

The proposed local policy in the PCEF device 10 with DPI capabilities allows activating locally defined PCC rules on detection of tunneled packets, without the need of PCRF server 12 interaction.

Abbreviations
3GPP Third Generation Partnership Project
AF Application Function
AVP Attribute Value Pair
BBERF Bearer Binding and Event Reporting Function
CCA Credit Control Answer
CCR Credit Control Request
DPI Deep Packet Inspection
GERAN GSM EDGE Radio Access Network
GGSN GPRS Gateway Support Node
GSM Group Special Mobile
ID Identifier
IMS IP Multimedia Subsystem
IP Internet Protocol
IP-CAN Internet Protocol Connectivity Access Network
PCC Policy and Charging Control
PCEF Policy and Charging Enforcement Function
PCRF Policy and Charging Rules Function
P-CSCF Proxy Call Session Control Function
PDN GW Packet Data Network Gateway
PDP Packet Data Protocol
QoS Quality of Service
RFC Request for Comments
SAPC Service Aware Policy Controller
SASN Service Aware Support Node
SPR Subscriber Profile Repository
TCP Transmission Control Protocol
TDF Traffic Detection Function

REFERENCES 1. 3GPP IS 23.203 "Policy and Charging Control Architecture"
2. 3GPP TS 29.212 "Policy and Charging Control over the Gx reference point"
3. 3GPP TS 29.214 "Policy and Charging Control over the Rx reference point"
4. RFC 2460 "Internet Protocol, Version 6 (IPv6) Specification"
5. RFC 3056 "Connection of IPv6 Domains via IPv4 Clouds"
6. RFC 4380 "Teredo: Tunneling IPv6 over UDP through Network Address Translations (NATs)"

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method of handling and enforcing rules at a policy and charging enforcement function (PCEF) device with deep packet inspection capability of a network having a policy and charging rules function (PCRF) server, the method comprising:
    detecting, by the PCEF device, a tunneled packet and the tunneled packet's Internet Protocol (IP) version type, wherein the tunneled packet is an IP packet encapsulated within another IP packet;
    determining, by the PCEF device, whether activation of policy and charging control (PCC) rules in accordance with the IP version type of the tunneled packet is required from the PCRF server;
    if activation of PCC rules is required from the PCRF server, requesting, by the PCEF device from the PCRF server, the activation of PCC rules, including identifying the IP version type of the tunneled packet to the PCRF server; and receiving, by the PCEF device from the PCRF server, the activation of PCC rules in accordance with the IP version type of the tunneled packet; and
    enforcing, by the PCEF device, PCC rules in accordance with the IP version type of the tunneled packet on the tunneled packet.

2. The method of claim 1, wherein receiving from the PCRF server the activation of PCC rules includes receiving from the PCRF server PCC rules in accordance with the IP version type of the tunneled packet to be enforced on the tunneled packet.

3. The method of claim 1, further comprising obtaining, from a memory of the PCEF device, PCC rules in accordance with the IP version type of the tunneled packet.

4. The method of claim 1, wherein requesting the activation of PCC rules includes sending, from the PCEF device, a Gx credit control request (CCR) update message that includes a request for activation of PCC rules and the IP version type of the tunneled packet.

5. The method of claim 4, wherein sending the Gx CCR update message includes sending a new tunneling indicator Attribute Value Pair (AVP) and at least one of a framed-IP-address AVP and a framed-IPv6-prefix AVP.

6. The method of claim 1, wherein detecting a tunneled packet and the tunneled packet's IP version type includes obtaining, from the tunneled packet, source and destination IP addresses, source and destination ports, and a protocol.

7. A policy and charging enforcement function (PCEF) device with deep packet inspection capability of a network having a policy and charging rules function (PCRF) server, the PCEF device comprising:
    a processor;
    a memory coupled to the processor; and
    a network interface coupled to the processor, wherein
    the processor is configured to detect a tunneled packet and the tunneled packet's Internet Protocol (IP) version type and to determine whether activation of policy and charging control (PCC) rules in accordance with the IP version type of the tunneled packet is required from the PCRF server, wherein the tunneled packet is an IP packet encapsulated within another IP packet;
    the network interface is in communication with the processor and the network, wherein if activation of PCC rules is required from the PCRF server, the network interface is configured to request from the PCRF server the activation of PCC rules, to identify the IP version type of the tunneled packet to the PCRF server, and to receive from the PCRF server the activation of PCC rules in accordance with the IP version type of the tunneled packet; and the processor is further configured to enforce PCC rules in accordance with the IP version type of the tunneled packet on the tunneled packet.

8. The PCEF device of claim 7, wherein the processor through the network interface is configured to receive from the PCRF server the PCC rules in accordance with the IP version type of the tunneled packet to be enforced on the tunneled packet.

9. The PCEF device of claim 7, wherein the processor is configured to obtain from a memory of the PCEF device the PCC rules in accordance with the IP version type of the tunneled packet to be enforced on the tunneled packet.

10. The PCEF device of claim 7, wherein the network interface is configured to send, to the PCRF server, a Gx Credit Control Request (CCR) update message that includes a request for activation of PCC rules and the IP version type of the tunneled packet.

11. The PCEF device of claim 10, wherein the Gx CCR update message includes a new tunneling indicator Attribute Value Pair (AVP) and at least one of a framed-IP-address AVP and a framed-IPv6-prefix AVP.

12. The PCEF device of claim 7, wherein the processor is further configured to obtain, from the tunneled packet, source and destination IP addresses, source and destination ports, and a protocol.

13. A method of handling rules at a policy and charging rules function (PCRF) server of a network having a policy and charging enforcement function (PCEF) device, the method comprising:

receiving, by the PCRF server, a request from the PCEF device for activation of policy and charging control (PCC) rules for a tunneled packet detected by the PCEF device, the request including an Internet Protocol (IP) version type of the tunneled packet, wherein the tunneled packet is an IP packet encapsulated within another IP packet;

determining, by the PCRF server, whether PCC rules in accordance with the IP version type of the tunneled packet have to be provided from the PCRF server; and sending the activation of the PCC rules in accordance with the IP version type of the tunneled packet from the PCRF server to the PCEF device.

14. The method of claim 13, further comprising selecting and activating, by the PCRF server, IP version 6 or IP version 4 PCC rules in accordance with the IP version type of the tunneled packet in a Gx credit control answer (CCA) update message, and sending the CCA update message from the PCRF server to the PCEF device.

15. A policy and charging rules function (PCRF) server of a network having a policy and charging enforcement function (PCEF) device, the PCRF server comprising:

a network interface configured to receive a request from the PCEF device for activation of policy and charging control (PCC) rules for a tunneled packet detected by the PCEF device, the request including an Internet Protocol (IP) version type of the tunneled packet, wherein the tunneled packet is an IP packet encapsulated within another IP packet;

a memory having PCC rules; and a processor coupled to the memory and configured to determine whether PCC rules in accordance with the IP version type of the tunneled packet have to be provided from the memory, and to send the activation of the PCC rules in accordance with the IP version type of the tunneled packet through the network interface to the PCEF device.

16. The PCRF server of claim 15, wherein the processor is further configured to select and activate IP version 6 PCC rules or IP version 4 PCC rules for the tunneled packet in a Gx credit control answer (CCA) update message, and to send the Gx CCA update message through the network interface to the PCEF device.

17. A non-transitory computer-readable medium having stored instructions that, when executed by a computer, cause the computer to carry out a method of handling and enforcing rules at a policy and charging enforcement function (PCEF) device with deep packet inspection capability of a network having a policy and charging rules function (PCRF) server, wherein the method comprises:

detecting, by the PCEF device, a tunneled packet and the tunneled packet's Internet Protocol (IP) version type, wherein the tunneled packet is an IP packet encapsulated within another IP packet;

determining, by the PCEF device, whether activation of policy and charging control (PCC) rules in accordance with the IP version type of the tunneled packet is required from the PCRF server;

if activation of PCC rules is required from the PCRF server, requesting, by the PCEF device from the PCRF server, the activation of PCC rules, including identifying the IP version type of the tunneled packet to the PCRF server; and receiving, by the PCEF device from the PCRF server, the activation of PCC rules in accordance with the IP version type of the tunneled packet; and enforcing, by the PCEF device, PCC rules in accordance with the IP version type of the tunneled packet on the tunneled packet.

18. The non-transitory computer-readable medium of claim 17, wherein receiving from the PCRF server the activation of PCC rules includes receiving from the PCRF server PCC rules in accordance with the IP version type of the tunneled packet to be enforced on the tunneled packet.

19. A non-transitory computer-readable medium having stored instructions that, when executed by a computer, cause the computer to carry out a method of handling rules at a policy and charging rules function (PCRF) server of a network having a policy and charging enforcement function (PCEF) device, wherein the method comprises:

receiving, by the PCRF server, a request from the PCEF device for activation of policy and charging control (PCC) rules for a tunneled packet detected by the PCEF device, the request including an Internet Protocol (IP) version type of the tunneled packet, wherein the tunneled packet is an IP packet encapsulated within another IP packet;

determining, by the PCRF server, whether PCC rules in accordance with the IP version type of the tunneled packet have to be provided from a memory of the PCRF server; and sending the activation of the PCC rules in accordance with the IP version type of the tunneled packet by the PCRF server to the PCEF device.

20. The non-transitory computer-readable medium of claim 19, wherein the method further comprises selecting and activating, by the PCRF server, IP version 6 or IP version 4 PCC rules in accordance with the IP version type of the tunneled packet in a Gx credit control answer (CCA) update message, and sending the CCA update message through the network interface of the PCRF server to the PCEF device.

* * * * *